(12) United States Patent
Ooba

(10) Patent No.: US 11,565,410 B2
(45) Date of Patent: Jan. 31, 2023

(54) ROBOT TASK SYSTEM

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 182 days.

(21) Appl. No.: 17/090,985

(22) Filed: Nov. 6, 2020

(65) Prior Publication Data
US 2021/0170592 A1 Jun. 10, 2021

(30) Foreign Application Priority Data

Dec. 4, 2019 (JP) .............................. JP2019-219473

(51) Int. Cl.
*B25J 9/16* (2006.01)
*B25J 13/08* (2006.01)

(52) U.S. Cl.
CPC ............ *B25J 9/1661* (2013.01); *B25J 9/1679* (2013.01); *B25J 9/1697* (2013.01); *B25J 13/088* (2013.01)

(58) Field of Classification Search
CPC .................. B25J 9/0093; B25J 13/088; G05B 2219/39102; G05B 2219/40007; G05B 2219/40554; G05B 19/4182; G05B 2219/40563; Y02P 90/02; B65G 47/905; B65C 9/26
See application file for complete search history.

(56) References Cited

U.S. PATENT DOCUMENTS

| | | | | |
|---|---|---|---|---|
| 2014/0135982 | A1* | 5/2014 | Majima | G05B 19/4182 700/247 |
| 2019/0232491 | A1* | 8/2019 | Ooba | B25J 9/1664 |
| 2020/0039754 | A1* | 2/2020 | Vuorenala | B66B 1/2408 |
| 2021/0153538 | A1* | 5/2021 | Liu | B26D 1/08 |

FOREIGN PATENT DOCUMENTS

JP 2000-071188 A 3/2000

* cited by examiner

*Primary Examiner* — Abby Y Lin
*Assistant Examiner* — Dylan Brandon Mooney
(74) *Attorney, Agent, or Firm* — Studebaker & Brackett PC

(57) ABSTRACT

A robot task system includes: a robot; a transfer device configured to be driven to transfer a plurality of workpieces thereon by a specific distance at a time, the plurality of workpieces being placed within the specific distance; a driving management unit configured to manage a driving distance and a driving start timing of the transfer device for driving the transfer device each time; a task position generation unit configured to generate a plurality of task positions at the driving start timing managed by the driving management unit, the plurality of task positions being positions for the robot to execute a predetermined task on the plurality of workpieces; a task unit configured to update, according to the driving of the transfer device, the plurality of task positions generated by the task position generation unit and generate a task command to cause the robot to execute the predetermined task on the plurality of workpieces while following the plurality of workpieces; and a control unit configured to control the transfer device based on the driving distance and the driving start timing of the transfer device, and control the robot based on the task command generated by the task unit.

7 Claims, 6 Drawing Sheets

ROBOT TASK SYSTEM

This application is based on and claims the benefit of priority from Japanese Patent Application No. 2019-219473, filed on 4 Dec. 2019, the content of which is incorporated herein by reference.

BACKGROUND OF THE INVENTION

Field of the Invention

The present disclosure relates to a robot task system.

Related Art

In a transfer device that includes a servo-driven conveyor, for example, workpieces are placed such that one workpiece is in one pitch by which the transfer device is driven at a time, and the workpieces are transferred pitch by pitch. In a robot task system having such a transfer device, a position of each workpiece in the corresponding pitch is generated as the transfer device is driven pitch by pitch.

The robot task system uses a robot to execute a task on the workpieces being transferred by the transfer device. As the transfer device moves pitch by pitch based on a servo driving signal from the robot or a robot peripheral, the robot performs the task while following the transfer device (workpieces) with a high degree of accuracy based on a machine pulse of a servomotor.

It is to be noted that Japanese Unexamined Patent Application, Publication No. 2000-71188 discloses a parts feeder aimed at reducing the time required to pick up parts as much as possible by enabling a robot to pick up each of the parts being transferred without returning to a standby position. This parts feeder includes: a conveyor configured to transfer parts; a visual recognition means configured to recognize a position and an orientation of each of the parts being transferred by the conveyor, and output the recognized position and orientation as recognition data; a movement amount measuring means configured to measure the amount of movement of each of the parts being transferred by the conveyor and output the amount of movement as movement amount data; a pick-up robot configured to pick up each of the parts being transferred; and a robot controller configured to store the recognition data and the movement amount data, and control operation of the pick-up robot based on the recognition data and the movement amount data.

Patent Document 1: Japanese Unexamined Patent Application, Publication No. 2000-71188

SUMMARY OF THE INVENTION

In a robot task system in which a robot performs a task on workpieces being transferred by a transfer device pitch by pitch, positions of the workpieces are in one-to-one correspondence with driving signals for the transfer device. In a case where a plurality of workpieces are transferred in one pitch on the transfer device, the robot is unable to execute the task on each of the plurality of workpieces in the one pitch.

A robot task system is therefore desired in which a transfer device transfers workpieces by a specific distance at a time, and even if a plurality of workpieces are placed within the specific distance, a robot is able to execute a task on each of the plurality of workpieces.

A robot task system according to an embodiment of the present disclosure includes a robot, a transfer device, a driving management unit, a task position generation unit, a task unit, and a control unit. The transfer device is driven to transfer a plurality of workpieces thereon by a specific distance at a time. The plurality of workpieces are placed within the specific distance. The driving management unit manages a driving distance and a driving start timing of the transfer device for driving the transfer device each time. The task position generation unit generates a plurality of task positions at the driving start timing of the transfer device managed by the driving management unit. The plurality of task positions are positions for the robot to execute a predetermined task on the plurality of workpieces. The task unit updates, according to the driving of the transfer device, the plurality of task positions generated for the robot by the task position generation unit and generates a task command to cause the robot to execute the predetermined task on the plurality of workpieces while following the plurality of workpieces. The control unit controls the transfer device based on the driving distance and the driving start timing of the transfer device managed by the driving management unit, and controls the robot based on the task command generated by the task unit.

In the robot task system according to the embodiment of the present disclosure, the transfer device transfers workpieces by a specific distance at a time, and even if a plurality of workpieces are placed within the specific distance, the robot is able to execute a task on each of the plurality of workpieces.

DETAILED DESCRIPTION OF THE INVENTION

Figure 1:
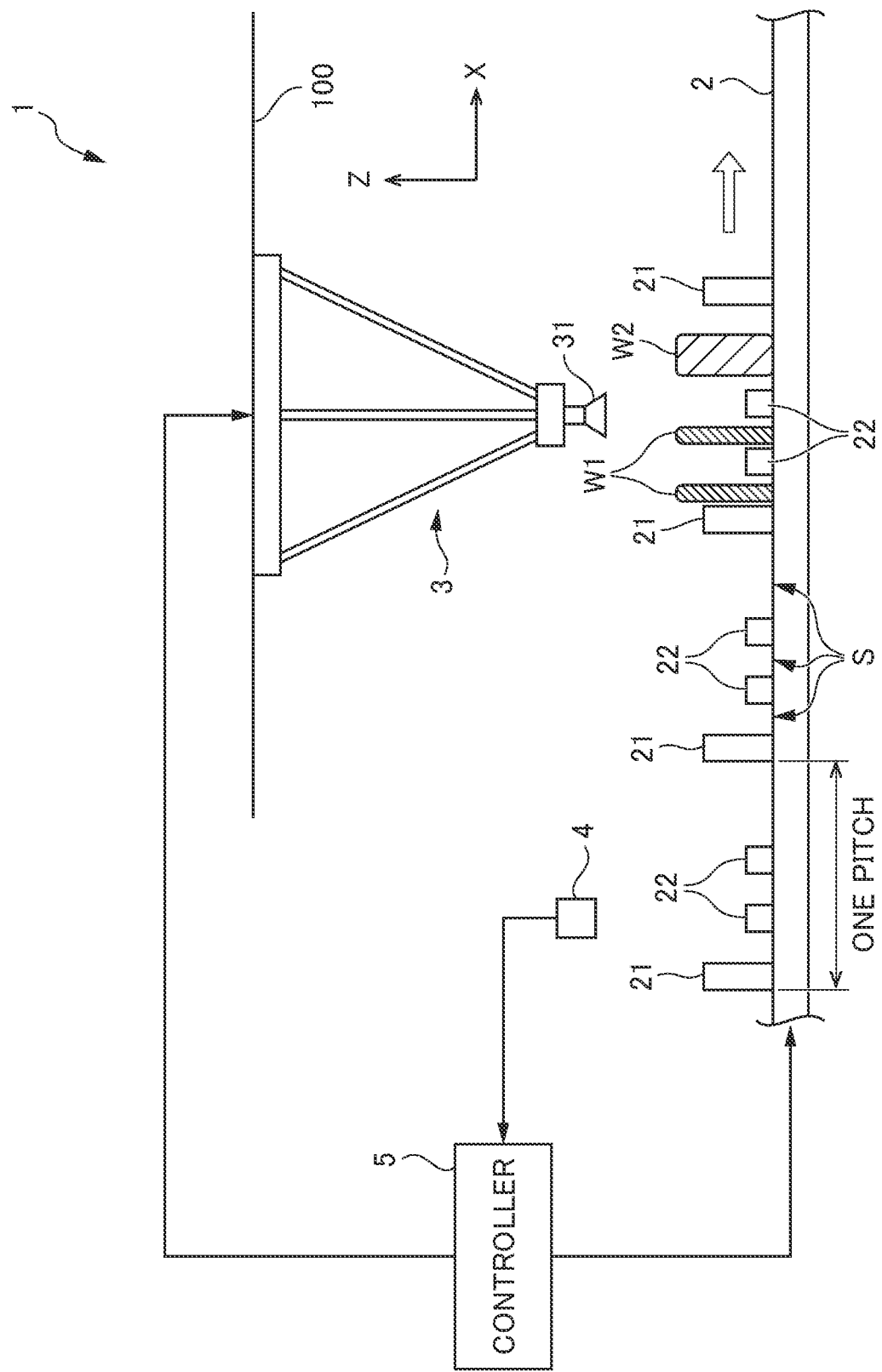
FIG. 1 illustrates an overall configuration of a robot task system according to an embodiment of the present disclosure.
Figure 2:
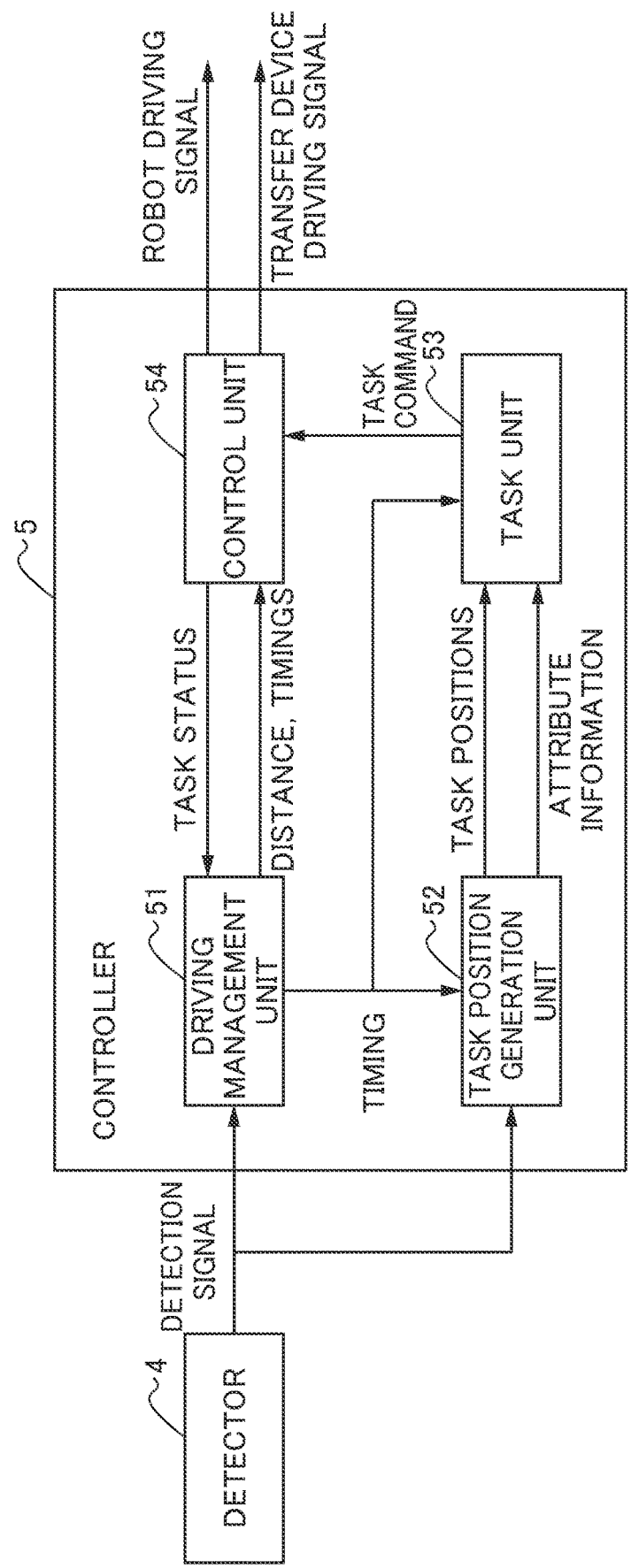
FIG. 2 is a block diagram illustrating the robot task system according to the embodiment of the present disclosure.

The following describes a robot task system according to an embodiment of the present disclosure with reference to the accompanying drawings. FIG. 1 illustrates an overall configuration of the robot task system according to the embodiment of the present disclosure. FIG. 2 is a block diagram illustrating the robot task system according to the embodiment of the present disclosure. As illustrated in FIG. 1, a robot task system 1 according to the present embodiment includes a transfer device 2 that transfers workpieces W, on which a task is to be executed, a robot 3 disposed in the vicinity of the transfer device 2, a detector 4 fixed in the vicinity of the transfer device 2, and a controller 5 that controls driving of the transfer device 2 and the robot 3.

X and Z in FIG. 1 represent a coordinate system of the transfer device 2 and the robot 3 in the robot task system 1. The X direction is along the moving direction of the transfer device 2. The Z direction is along the direction of gravitational force.

The transfer device 2 includes a servo-driven conveyor, which is driven by a servomotor (not shown). The transfer device 2 is driven by the servomotor controlled by the controller 5 to move by a specific distance at a time in the X direction, which is represented by an outlined arrow in FIG. 1.

A top surface of the transfer device 2 has a plurality of first dividers 21 stood and arranged in the moving direction of the transfer device 2 with a specific distance in between them, and a plurality of second dividers 22 stood and arranged between adjacent first dividers 21. The first dividers 21 are taller than the second dividers 22. The distance between adjacent first dividers 21 corresponds to one pitch by which the transfer device 2 is driven at a time. That is, the transfer device 2 is driven by the servomotor to move by the distance between adjacent first dividers 21 (one pitch) at a time.

On the transfer device 2, different types of workpieces W1 and W2 are placed between adjacent first dividers 21. Specifically, the plurality of second dividers 22 stood and arranged between adjacent first dividers 21 form a plurality of workpiece placement areas S between the adjacent first dividers 21. In an example illustrated in FIG. 1, two second dividers 22 are stood and arranged between every two adjacent first dividers 21, forming three workpiece placement areas S. On the transfer device 2 illustrated in FIG. 1, the following three workpieces are respectively placed in the three workpiece placement areas S within one pitch: two workpieces W1 and W1 of the same type and one workpiece W2 of different type from the workpieces W1 and W1. Accordingly, the transfer device 2 collectively transfers the three workpieces W1, W1, and W2 placed within the one pitch by being driven by the servomotor and moving pitch by pitch.

The robot 3 may be of any type according to the type of the task to be executed on the workpieces on the transfer device 2. For example, the robot 3 may be a floor-mounted robot or a ceiling-suspended robot. The robot 3 illustrated in FIG. 1 is suspended from a ceiling 100 above the transfer device 2, and a lower end thereof includes a robot hand 31 capable of holding the workpieces W1 and W2. The robot 3 is driven and controlled by a robot controller (not shown) to move the robot hand 31 upward and downward in the Z direction. Furthermore, the robot 3 is able to move the robot hand 31 in any direction intersecting with the Z direction. This allows the robot 3 to execute a predetermined task on the workpieces W1 and W2 on the transfer device 2. The predetermined task is, for example, a sorting task for transporting each workpiece W1 and each workpiece W2 on the transfer device 2 to respective predetermined places, or a stickering task for putting stickers on the workpieces W1 and W2 on the transfer device 2.

The detector 4 is disposed upstream of the robot 3 in the moving direction of the transfer device 2, and detects the presence or absence of the workpieces W1 and W2 on the transfer device 2 (placement of the workpieces W1 and W2 on the transfer device 2) and also detects the positions of the workpieces W1 and W2 in one pitch in the moving direction of the transfer device 2. No particular limitations are placed on specific devices that may be used as the detector 4, and examples thereof include a two-dimensional camera that has a field of view in an area spanning at least one pitch on the transfer device 2 and a photoelectric sensor that detects the workpieces W1 and W2 on the transfer device 2 using light. The detector 4 illustrated in FIG. 1 includes a two-dimensional camera that captures a two-dimensional image of the workpieces W1 and W2 from above the transfer device 2. The detector 4 outputs a detection signal (including the two-dimensional image) to the controller 5.

The controller 5 generates and outputs a transfer device driving signal to the servomotor of the transfer device 2 thereby to control the driving of the transfer device 2. The controller 5 also generates and outputs a robot driving signal to the robot controller (not shown) of the robot 3 thereby to control the driving of the robot 3. As illustrated in FIG. 2, the controller 5 has a driving management unit 51, a task position generation unit 52, a task unit 53, and a control unit 54.

The driving management unit 51 manages a driving distance (a distance by which the transfer device 2 is to move workpieces each time) and a driving start timing (when to start moving workpieces each time) of the transfer device 2. Specifically, the driving management unit 51 generates, in accordance with a prescribed program for management of the transfer device 2, information indicating a predetermined driving distance for each pitch on the transfer device 2 and information indicating a predetermined timing to start driving the transfer device 2 for each pitch on the transfer device 2. The driving distance and the driving start timing of the transfer device 2 are preset as defaults. The information indicating the driving distance and the information indicating the driving start timing generated by the driving management unit 51 are outputted to the control unit 54. Among those generated by the driving management unit 51, the information indicating the driving start timing is also outputted to the task position generation unit 52 and the task unit 53.

The driving distance and the driving start timing to be generated by the driving management unit 51 are controlled based on a signal inputted externally to the controller 5. Specifically, using a detection signal inputted from the detector 4 as a trigger, the driving management unit 51 generates the information indicating the driving distance of the transfer device 2 and the information indicating the driving start timing of the transfer device 2. This facilitates the generation of the information indicating the driving distance of the transfer device 2 and the information indicating the driving start timing of the transfer device 2.

Either or both of the information indicating the driving distance and the information indicating the driving start timing to be generated by the driving management unit 51 are variable based on information indicating a task status of the robot 3, which is transmitted from the control unit 54 described below. The information indicating the task status of the robot 3 is as to whether or not the task has been executed on all of the different types of workpieces W1 and W2 in one pitch on the transfer device 2 and whether the robot 3 can transition to the task for the next pitch. Specifically, upon determining that the robot 3 executing the task is somewhat lagging behind the driving speed of the transfer device 2 based on the information indicating the task status transmitted from the control unit 54, for example, the driving management unit 51 performs either or both of control to decrease the preset driving distance for each pitch on the transfer device 2 relative to the driving distance in normal driving and control to retard the preset driving start timing of the transfer device 2 relative to the driving start timing in normal driving. This enables the robot 3 to reliably execute the task on the different types of workpieces W1 and W2.

For another example, upon determining that the driving of the transfer device 2 is somewhat lagging behind the robot 3 executing the task, the driving management unit 51 performs either or both of control to increase the preset driving distance for each pitch on the transfer device 2 relative to the driving distance in normal driving and control to accelerate the preset driving start timing of the transfer device 2 relative to the driving start timing in normal driving. This enables the robot 3 to swiftly execute the task on the different types of workpieces W1 and W2.

The task position generation unit 52 generates a plurality of task positions for the robot 3 to execute the task on the different types of workpieces W1 and W2 in one pitch on the transfer device 2 based on the information indicating the driving start timing of the transfer device 2 managed and inputted by the driving management unit 51. Specifically, the task position generation unit 52 generates, as the task positions for the robot 3, positional coordinates (X-Z coordinates) of each of the workpieces W1 and W2 in one pitch on the transfer device 2 based on the detection signal inputted from the detector 4 and the information indicating the driving start timing of the transfer device 2 inputted from the driving management unit 51. That is, even if a plurality of articles W1 and W2 of different types are placed in one pitch on the transfer device 2, a task position is generated for each of the plurality of articles W1 and W2 of different types in the one pitch. Information indicating the task positions for the robot (positional coordinates of each of the workpieces W1 and W2) generated by the task position generation unit 52 is outputted to the task unit 53.

The task position generation unit 52 may further generate attribute information for each of the different types of workpieces W1 and W2 when the transfer device 2 is driven. The attribute information for each of the workpieces W1 and W2 is information that is related to each of the workpieces W1 and W2, and that is necessary when the robot 3 executes the task on each of the workpieces W1 and W2. Specifically, in a case where the task of the robot 3 is a task for sorting out the workpieces W1 and W2, for example, the attribute information is position information of respective destinations to which each workpiece W1 and each workpiece W2 are to be transported. In a case where the task of the robot 3 is a task for stickering the workpieces W1 and W2, for example, the attribute information is information indicating a type of sticker to be put on each of the workpieces W1 and W2.

The attribute information is prestored in the task position generation unit 52 or in a storage unit (not shown) or the like, of the controller 5 in association with each of the workpieces W1 and W2. The task position generation unit 52 recognizes the workpieces W1 and W2 by, for example, performing image processing, such as pattern matching, on the workpieces W1 and W2 on the transfer device 2 based on the detection signal inputted from the detector 4, and reads out the attribute information associated with the workpieces W1 and W2. The attribute information generated by the task position generation unit 52 is associated with the positional coordinates of the workpieces W1 and W2, and is outputted to the task unit 53. This enables the robot task system 1 to cause the robot 3 to readily execute the task in ways respectively corresponding to the different types of workpieces W1 and W2.

Figure 3:
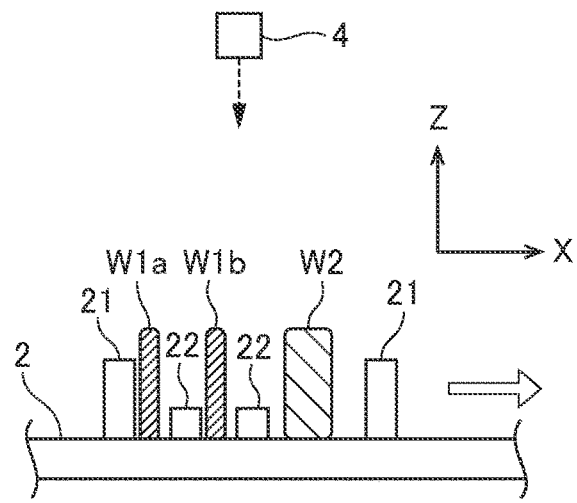
FIG. 3 illustrates task positions being updated in the robot task system according to the embodiment of the present disclosure.

The task unit 53 updates, according to the driving of the transfer device 2, the information indicating the plurality of task positions (positional coordinates of each of the workpieces W1 and W2) generated for the robot 3 by the task position generation unit 52 and generates a task command to cause the robot 3 to execute a predetermined task on the different types of workpieces W1 and W2 while following the workpieces W1 and W2. Specifically, in a case where a workpiece W1a, a workpiece W1b, and a workpiece W2 placed on the transfer device 2 are under the detector 4 as illustrated in FIG. 3, the task position generation unit 52 generates a plurality of task positions (positional coordinates of each of the workpieces W1 and W2) for the robot 3 based on a detection signal from the detector 4. At the time of detection by the detector 4, the positional coordinates of the workpiece W1a are (X: 0090, Z: 0010), the positional coordinates of the workpiece W1b are (X: 0080, Z: 0010), and the positional coordinates of the workpiece W2 are (X: 0070, Z: 0010) in FIG. 3.

Figure 4:
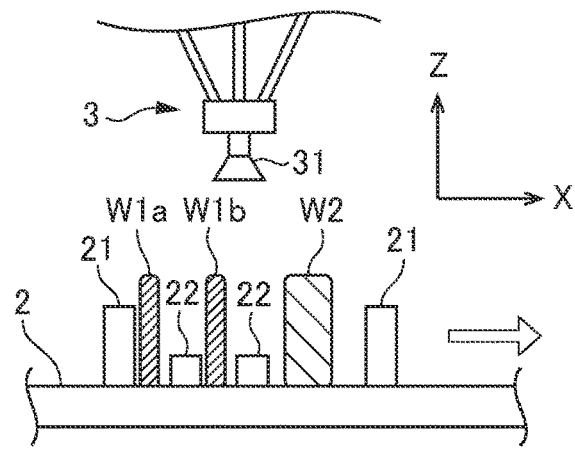
FIG. 4 illustrates the task positions being updated in the robot task system according to the embodiment of the present disclosure.

The transfer device 2 is driven by the servomotor to move in the direction represented by an outlined arrow in FIG. 3. Accordingly, as illustrated in FIG. 4, the positional coordinates at a point in time of arrival of the workpieces W1a, W1b, and W2 at a task execution range of the robot 3 are different from the positional coordinates at the point in time of the detection by the detector 4 illustrated in FIG. 3 by the distance the transfer device 2 has moved since the detection. At the time of arrival at the task execution range of the robot 3, the positional coordinates of the workpiece W1a are (X: 0030, Z: 0010), the positional coordinates of the workpiece W1b are (X: 0020, Z: 0010), and the positional coordinates of the workpiece W2 are (X: 0010, Z: 0010) in FIG. 4.

As described above, the task unit 53 updates, according to the driving of the transfer device 2, the information indicating the plurality of task positions for the robot 3 (positional coordinates of each of the workpieces W1 and W2) based on the information indicating the driving start timing of the transfer device 2 transmitted from the driving management unit 51. By doing so, the task unit 53 monitors whether or not the workpieces W1 and W2 have arrived at the task execution range of the robot 3 and whether or not it is the right time for the robot 3 to start the task. Upon determining that the workpieces W1 and W2 have arrived at the task execution range of the robot 3 and it is the right time for the robot 3 to start the task as a result of the monitoring, the task unit 53 generates a task command to cause the robot 3 to execute a predetermined task on the different types of workpieces W1 and W2 while following the workpieces W1 and W2, and outputs the task command to the control unit 54 together with the attribute information transmitted from the task position generation unit 52.

The control unit 54 controls the transfer device 2 based on the driving distance and the driving start timing of the transfer device 2 managed and inputted by the driving management unit 51, and controls the robot 3 based on the task command generated and inputted by the task unit 53, in accordance with a prescribed control program. That is, upon receiving the information indicating the driving start timing of the transfer device 2 inputted from the driving management unit 51, the control unit 54 generates and outputs a transfer device driving signal to the servomotor of the transfer device 2. In response to this, in normal driving, the transfer device 2 is driven by the preset driving distance for each pitch to move the workpieces W1 and W2 pitch by pitch. Furthermore, upon receiving the task command for the robot 3 inputted from the task unit 53, the control unit 54 generates and outputs, to the robot controller, a robot driving signal to control the driving of the robot 3. In response to this, the robot 3 executes a predetermined task, such as a sorting task, on each of the different types of workpieces W1 and W2 in one pitch.

Figure 5:
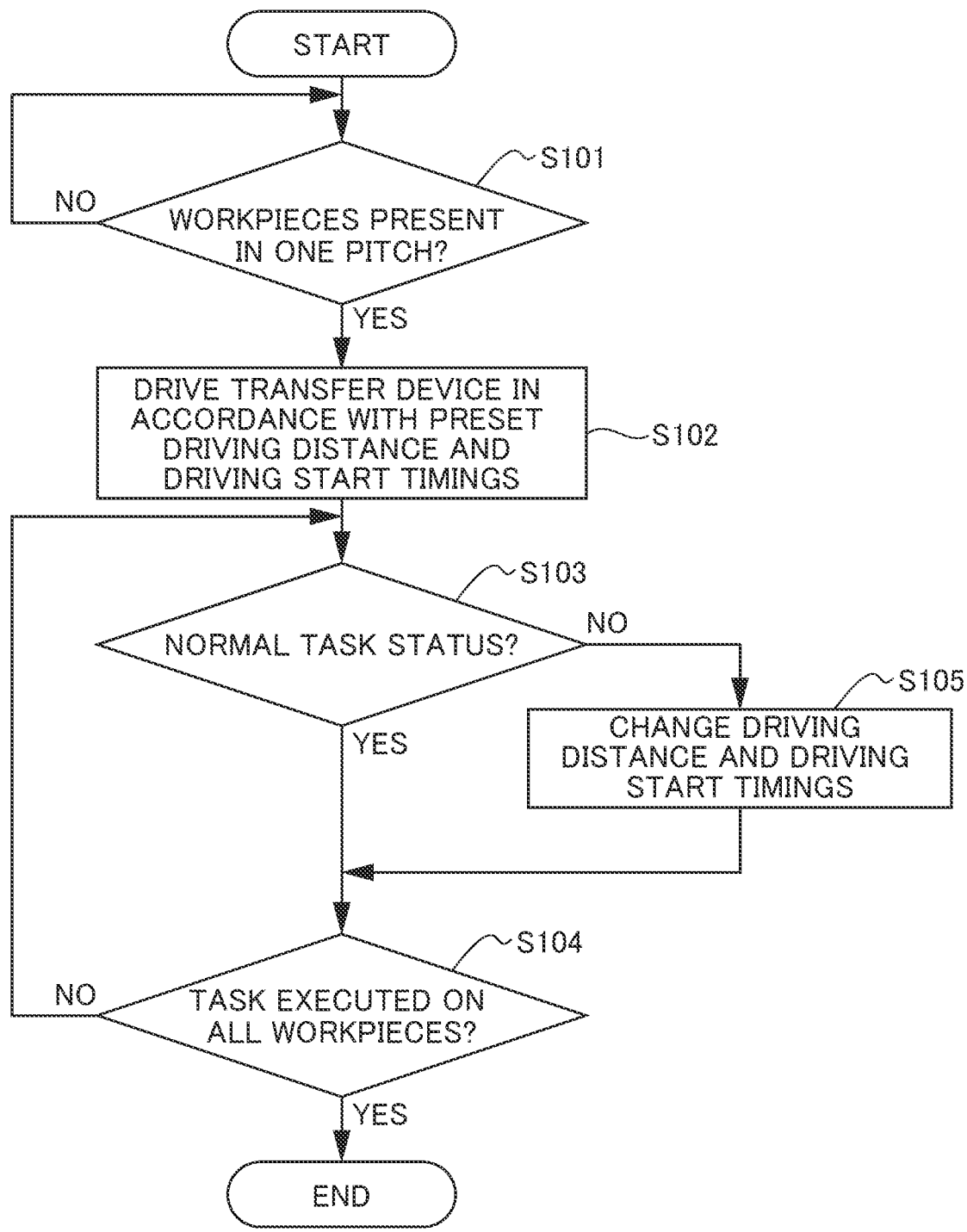
FIG. 5 is a flowchart showing an operation of a transfer device in the robot task system according to the embodiment of the present disclosure.
Figure 6:
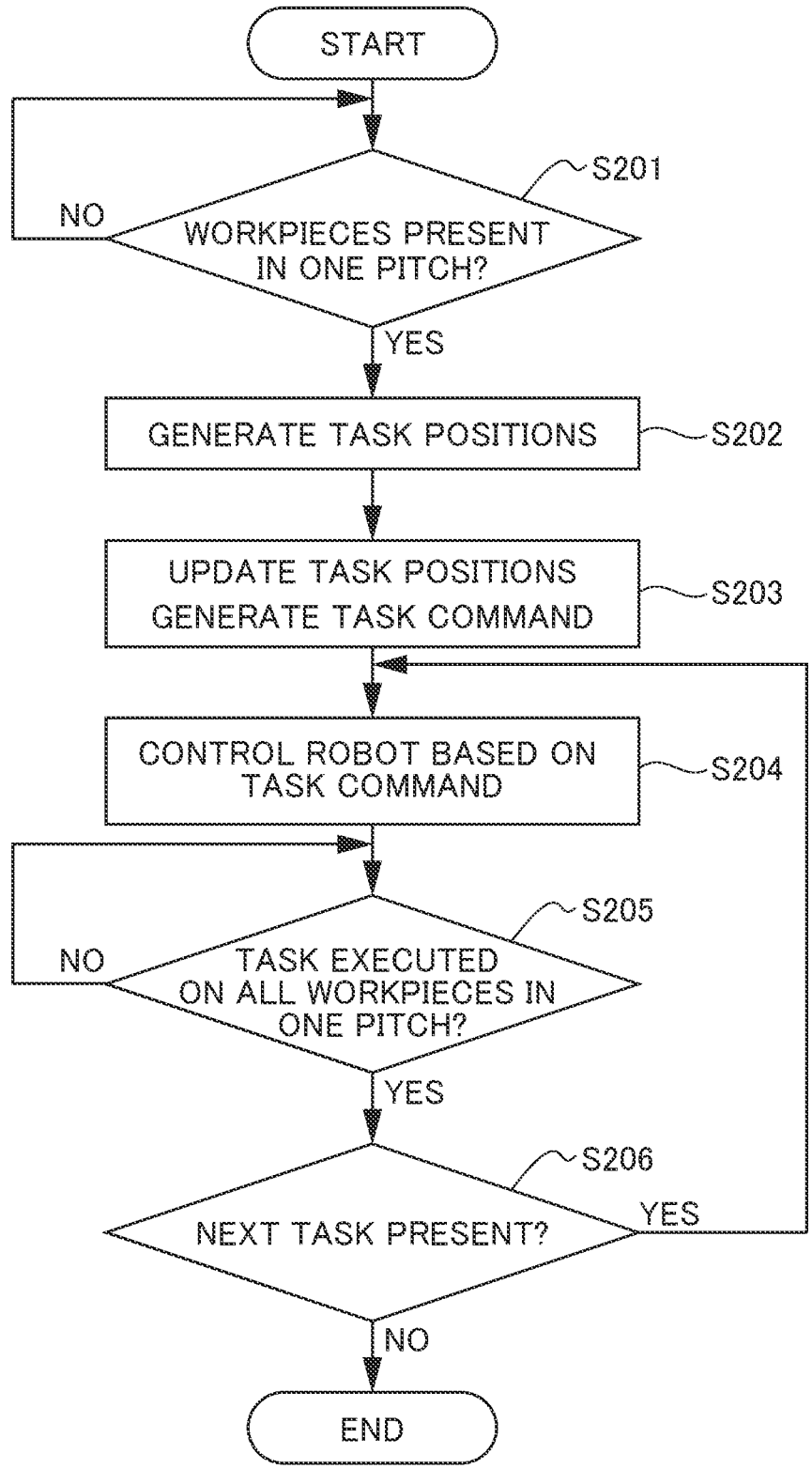
FIG. 6 is a flowchart showing an operation of a robot in the robot task system according to the embodiment of the present disclosure.

Next, a specific operation of the robot task system 1 will be described using the flowcharts in FIGS. 5 and 6. FIG. 5 is a flowchart showing an operation of the transfer device 2 in the robot task system 1 according to the above-described embodiment of the present disclosure. FIG. 6 is a flowchart showing an operation of the robot 3 in the robot task system 1 according to the above-described embodiment of the present disclosure.

First, as shown in FIG. 5, the driving management unit 51 of the controller 5 monitors whether or not any workpieces are placed on the transfer device 2 at a predetermined frequency (S101). Upon detecting workpieces placed in one pitch on the transfer device 2 through a detection signal from the detector 4 (YES at Step S101), the driving management unit 51 outputs, to the control unit 54, the information indicating the preset driving distance of the transfer device 2 and the information indicating the preset driving start timing of the transfer device 2. In response to this, the control unit 54 generates and outputs a transfer device driving signal to the servomotor to drive the transfer device 2 in accordance with the preset driving distance and the preset driving start timing (3102).

Once the driving of the transfer device 2 has started, the driving management unit 51 monitors the task status of the robot 3 transmitted from the control unit 54 (S103). If the task status of the robot 3 is determined to be normal at Step S103 (YES at Step S103), the operation advances to Step S104, and the driving of the transfer device 2 and the robot 3 is continued until the task has been executed on all of the workpieces being transferred by the transfer device 2.

If the task status of the robot 3 is not determined to be normal at Step S103 (NO at Step S103), the driving management unit 51 changes either or both of the default of the driving distance of the transfer device 2 and the default of the driving start timing of the transfer device 2 (S105). Thereafter, the operation advances to Step S104, and the driving of the transfer device 2 and the robot 3 is continued until the task has been executed on all of the workpieces being transferred by the transfer device 2 as described above.

Meanwhile, as shown in FIG. 6, the task position generation unit 52 of the controller 5 monitors whether or not any workpieces are placed on the transfer device 2 at a predetermined frequency (S201). Upon detecting workpieces placed in one pitch on the transfer device 2 through a detection signal from the detector 4 (YES at Step S201), the task position generation unit 52 determines positional coordinates of each of the workpieces, which are different types of workpieces W1 and W2, in the one pitch on the transfer device 2 based on the detection signal from the detector 4, and generates and outputs, to the task unit 53, task positions for the robot 3 to execute a predetermined task (S202). At the same time, the task position generation unit 52 also generates and outputs, to the task unit 53, attribute information for each of the workpieces W1 and W2 in addition to the task positions.

The task unit 53 updates the task positions for the robot 3 transmitted from the task position generation unit 52 based on the information indicating the driving start timing of the transfer device 2 transmitted from the driving management unit 51, generates a task command based on the updated task positions and the attribute information transmitted from the task position generation unit 52, and outputs the task command to the control unit 54 (S203).

Next, the control unit 54 controls the robot 3 by generating and outputting, to the robot controller, a robot driving signal to drive the robot 3 based on the task command transmitted from the task unit 53 (S204). Under this control, the robot 3 keeps executing the predetermined task while following the workpieces W1 and W2 until the task has been executed on all of the different types of workpieces W1 and W2 in the one pitch (S205). During the execution of the task, the information indicating the task status of the robot 3 is outputted from the control unit 54 to the driving management unit 51 at a predetermined frequency, so that the driving management unit 51 determines whether or not the task status of the robot 3 is normal at Step S103 in the flowchart shown in FIG. 5.

Once the robot 3 has executed the task on all of the workpieces W1 and W2 in the one pitch on the transfer device 2 (YES at Step S205), the control unit 54 determines whether or not there is a task to be executed on workpieces in the next pitch that are transferred by the transfer device 2, that is, whether or not there is another task command received from the task unit 53 (S206). If there is a task to be executed next (YES at Step S206), the processes at and after Step S204 are repeated. If there is not a task to be executed next (NO at Step S206), the operation ends.

Figure 7:
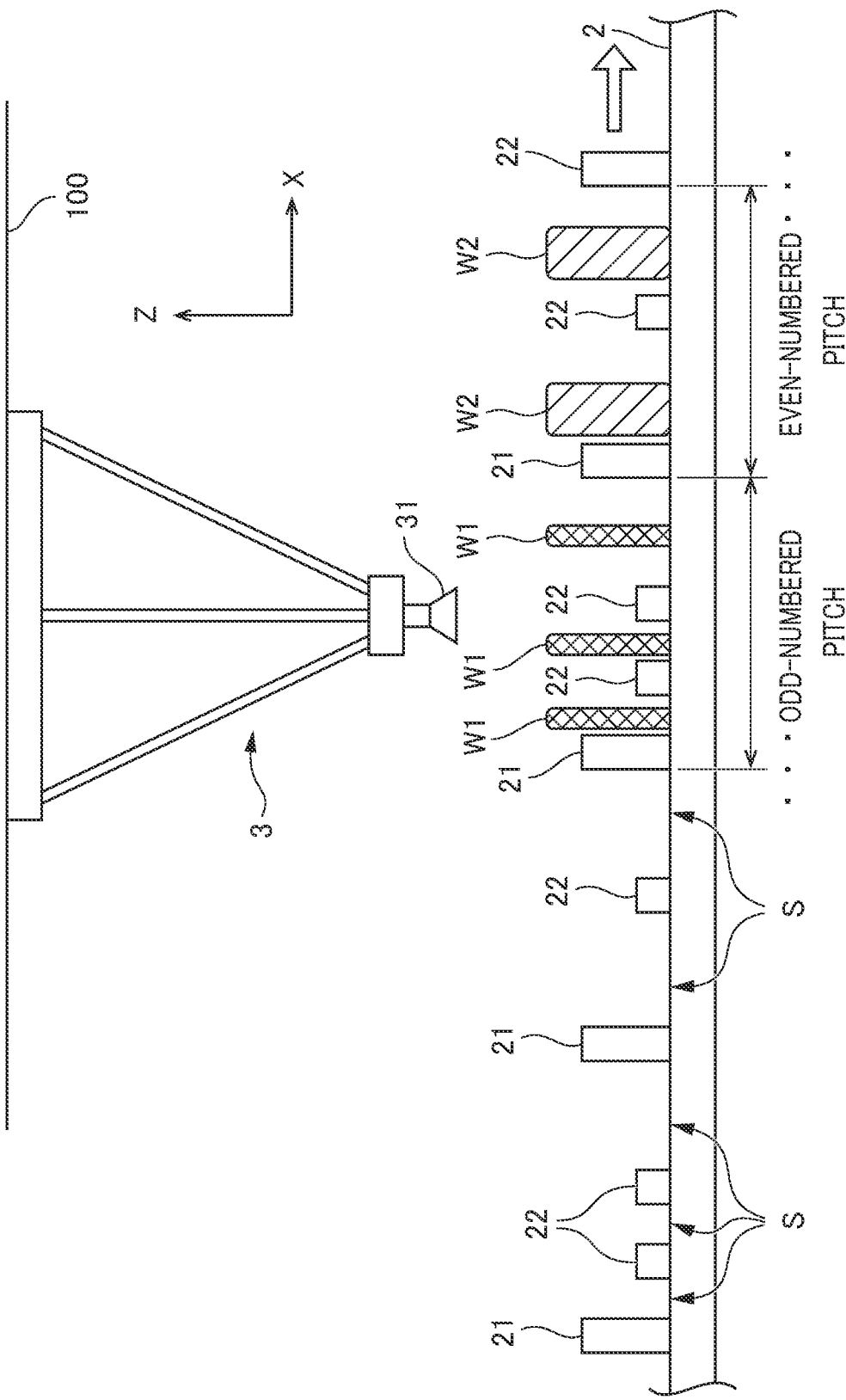
FIG. 7 illustrates a transfer device in a robot task system according to another embodiment of the present disclosure.

The transfer device 2 illustrated in FIG. 1 has the same number of (three) workpiece placement areas S in each pitch. However, the number of workpiece placement areas S in each pitch on the transfer device 2 does not have to be the same. Furthermore, either or both of the type and the number of workpieces may differ depending on the pitch on the transfer device 2. For example, the transfer device 2 illustrated in FIG. 7 has a different number of workpiece placement areas S in even-numbered pitches than in odd-numbered pitches. In this case, the task position generation unit 52 can generate positional coordinates of different types of workpieces W1 and W2 for each pitch based on the count of driving start timings of the transfer device 2, that is, based on whether the pitch is an even-numbered pitch or an odd-numbered pitch. This enables the task position generation unit 52 to generate task positions for the robot 3 on a workpiece-by-workpiece basis (positional coordinates of each of the workpieces) even if either or both of the type and the number of workpieces differ depending on the pitch on the transfer device 2.

In the configuration of the controller 5 illustrated in FIG. 2, the transfer device driving signal and the robot driving signal are outputted from a single control unit 54. In another configuration, the transfer device driving signal and the robot driving signal may be respectively outputted from control units that are independent from each other (a control unit for the transfer device and a control unit for the robot).

Furthermore, the constituent elements of the controller 5 are not limited to being provided in one part. One or more of the constituent elements of the controller 5 may be provided in another part of the robot task system 1 (for example, a servo controller that controls the driving of the transfer device 2 or the robot controller that controls the driving of the robot 3) separately from the other constituent elements.

The robot task system 1 according to the above-described embodiment of the present disclosure produces effects described below. The robot task system 1 includes: a robot 3; a transfer device 2 configured to be driven to transfer a plurality of workpieces W1 and W2 thereon by a specific distance at a time, the plurality of workpieces W1 and W2 being placed within the specific distance; a driving management unit 51 configured to manage a driving distance and a driving start timing of the transfer device 2 for driving the transfer device 2 each time; a task position generation unit 52 configured to generate a plurality of task positions at the driving start timing of the transfer device 2 managed by the driving management unit 51, the plurality of task positions being positions for the robot 3 to execute a predetermined task on the plurality of workpieces W1 and W2; a task unit 53 configured to update, according to the driving of the transfer device 2, the plurality of task positions generated for the robot 3 by the task position generation unit 52 and generate a task command to cause the robot 3 to execute the predetermined task on the plurality of workpieces W1 and W2 while following the plurality of workpieces W1 and W2; and a control unit 54 configured to control the transfer device 2 based on the driving distance and the driving start timing of the transfer device 2 managed by the driving management unit 51, and control the robot 3 based on the task command generated by the task unit 53. According to this configuration, even if a plurality of workpieces W1 and W2 are placed within a specific distance (one pitch) by which the transfer device 2 transfers the workpieces W1 and W2 at a time, a task position for the robot 3 is generated for each of the plurality of workpieces W1 and W2 (positional coordinates of each of the workpieces W1 and W2). This enables the robot 3 to execute a task on each of the workpieces W1 and W2.

The driving management unit 51 changes either or both of the driving distance and the driving start timing of the transfer device 2 depending on a task status of the robot 3. This enables the robot 3 to reliably execute the task on the plurality of workpieces W1 and W2 being transferred by the transfer device 2.

The driving management unit 51 controls the driving distance and the driving start timing of the transfer device 2 based on an externally inputted signal. This facilitates the generation of the information indicating the driving distance of the transfer device 2 and the information indicating the driving start timing of the transfer device 2.

The task position generation unit 52 generates positions of the plurality of workpieces W1 and W2 based on a count of the driving start timings of the transfer device 2. This enables the task position generation unit 52 to generate task positions for the robot 3 on a workpiece-by-workpiece basis (positional coordinates of each of the workpieces) even if either or both of the type and the number of workpieces differ depending on the pitch on the transfer device 2.

The task position generation unit 52 further generates attribute information for each of the plurality of workpieces W1 and W2 at the driving start timing of the transfer device 2, and the task unit 53 generates the task command based on the attribute information generated by the task position generation unit 52. This enables the robot task system 1 to cause the robot 3 to readily execute the task in ways respectively corresponding to the different types of workpieces W1 and W2.

EXPLANATION OF REFERENCE NUMERALS

1: Robot task system
2: Transfer device
3: Robot
51: Driving management unit
52: Task position generation unit
53: Task unit
54: Control unit
W1, W1a, W1b, W2: Workpieces

What is claimed is:

1. A robot task system comprising:
   a robot;
   a transfer device configured to be driven to transfer a plurality of workpieces thereon by a specific distance at a time, the plurality of workpieces being placed within the specific distance; and
   a processor, the processor being configured to:
   manage a driving distance and a driving start timing of the transfer device for driving the transfer device each time;
   generate a plurality of task positions at the managed driving start timing of the transfer device, the plurality of task positions being positions for the robot to execute a predetermined task on the plurality of workpieces;
   update, according to the driving of the transfer device, the generated plurality of task positions and generate a task command to cause the robot to execute the predetermined task on the plurality of workpieces while following the plurality of workpieces; and
   control the transfer device based on the managed driving distance and the managed driving start timing of the transfer device, and control the robot based on the generated task command,
   wherein the transfer device includes a plurality of first dividers arranged in a moving direction of the transfer device at a specific distance, which is a driving distance or a pitch, and at least one second divider arranged between the plurality of first dividers.

2. The robot task system according to claim 1, wherein the processor changes either or both of the driving distance and the driving start timing of the transfer device depending on a task status of the robot.

3. The robot task system according to claim 1, wherein the processor controls the driving distance and the driving start timing of the transfer device based on an externally inputted signal.

4. The robot task system according to claim 1, wherein the processor generates positions of the plurality of workpieces based on an order of pitches of the transfer device defined by the plurality of first dividers.

5. The robot task system according to claim 1, wherein the processor
   further generates attribute information for each of the plurality of workpieces at the driving start timing of the transfer device, and
   generates the task command based on the generated attribute information.

6. The robot task system according to claim 1, wherein the plurality of first dividers have a different appearance than the at least one second divider.

7. The robot task system according to claim 6, wherein the plurality of first dividers have a different height than the at least one second divider.

* * * * *